United States Patent
Meier et al.

(10) Patent No.: US 9,582,569 B2
(45) Date of Patent: Feb. 28, 2017

(54) TARGETED CONTENT DISTRIBUTION BASED ON A STRENGTH METRIC

(71) Applicant: Rolonews LP, County Meath (IE)

(72) Inventors: Paul Meier, Worcestershire (GB); Karl Capp, West Hendred (GB); Boumediene Mourad Khelifa, Bromley (GB)

(73) Assignee: Rolonews LP (IE)

( * ) Notice: Subject to any disclaimer, the term of this patent is extended or adjusted under 35 U.S.C. 154(b) by 329 days.

(21) Appl. No.: 14/267,199

(22) Filed: May 1, 2014

(65) Prior Publication Data
US 2014/0330760 A1 Nov. 6, 2014

(30) Foreign Application Priority Data
May 2, 2013 (GB) .................................. 1307987.6

(51) Int. Cl.
*G06F 17/30* (2006.01)
*G06N 99/00* (2010.01)

(52) U.S. Cl.
CPC ..... *G06F 17/30663* (2013.01); *G06F 17/3089* (2013.01); *G06N 99/005* (2013.01)

(58) Field of Classification Search
None
See application file for complete search history.

(56) References Cited

U.S. PATENT DOCUMENTS

| 8,239,397 B2 * | 8/2012 | Stefik | G06F 17/30705 707/758 |
| 2002/0082901 A1 * | 6/2002 | Dunning | G06F 17/30017 705/26.63 |
| 2004/0059705 A1 * | 3/2004 | Wittke | G06N 5/00 |
| 2006/0242309 A1 | 10/2006 | Damick et al. | |
| 2008/0010337 A1 * | 1/2008 | Hayes | G06Q 10/00 709/202 |
| 2013/0047260 A1 | 2/2013 | Hoefel et al. | |

OTHER PUBLICATIONS

Extended European Search Report for Application No. 14163700.9 dated Sep. 10, 2014.
Abbreviated Examination Report for Application No. GB 1307987.6 dated Oct. 29, 2013.

* cited by examiner

*Primary Examiner* — Alan Chen
(74) *Attorney, Agent, or Firm* — Lerner, David, Littenberg, Krumholz & Mentlik, LLP

(57) ABSTRACT

The distribution of content items, such as news items, in a news publishing platform is governed by a plurality of interrelated factors. These factors include publisher bias, trust bias, and user-specific bias, which reflect the user's reading history, the social clusters to which the user belongs, the user's location etc. To model the relevance of each content item to a given user, a metric of the overall story strength is calculated in accordance with one or more of these biases. The content item is delivered to the target in accordance with the story strength metric.

16 Claims, 16 Drawing Sheets

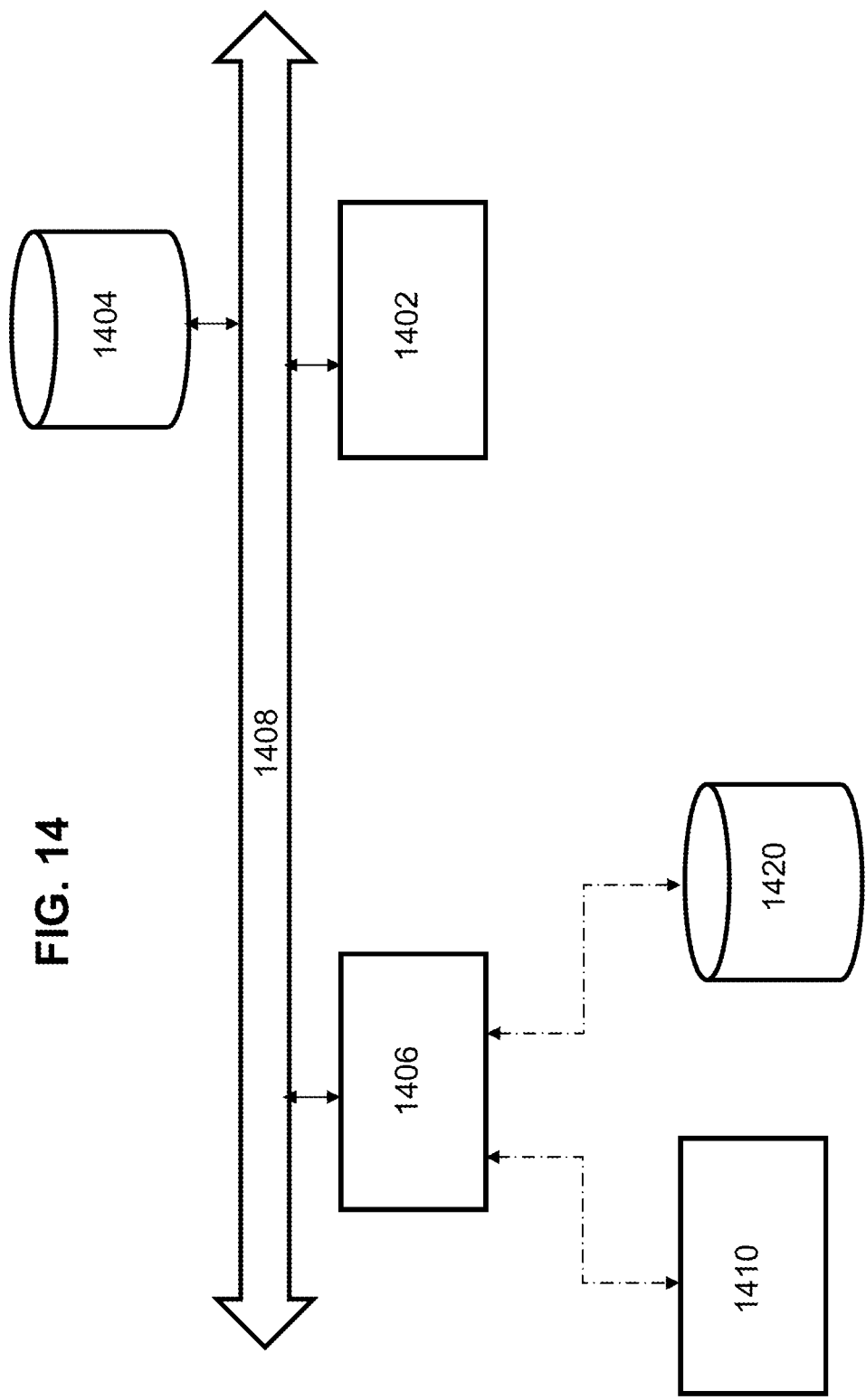

TARGETED CONTENT DISTRIBUTION BASED ON A STRENGTH METRIC

CROSS REFERENCE TO RELATED APPLICATIONS

The present application claims the benefit of and priority to GB Application No. 1307987.6, filed May 2, 2013, the entire disclosure of which is incorporated by reference herein.

BACKGROUND OF THE INVENTION

Field of the Invention

The invention relates to a method and system for content distribution. Embodiments of the invention relate in particular to the digital distribution of news content under dynamic editorial control.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In print media, news content is prepared for publication by journalists, reporters, editors etc. then assembled into a published news publication (a daily newspaper, or a magazine for example). Exercising control over the placement, timing, news content, writing style and tone, political bias, etc. is the role of one or more content editors.

The rapid adoption of digital media alongside or in place of print media has created ever more potential content (and indeed sources of content) from which content editors are asked to select suitable articles for their readers. Sources of content may include anything from an established news agency delivering news reports for syndication to a citizen journalist updating his weblog (also known as a "blog"). The forms of digital media have also proliferated: content may be published as a news feed (using technology such as RSS or Atom), as an article on a web page or a blog, as "short form" messages on social networking websites (such as "tweets" on Twitter [RTM] or "status" updates on Facebook [RTM]).

In a typical digital media scenario, a reader subscribes to a web-based news publishing service. Using a username and password to authenticate access, the reader then uses a web interface, such as an internet browser application or a dedicated application (such as an "app" for a touchscreen tablet device or mobile phone), to view and/or interact with the output of the publishing service. The web interface delivers news articles, marketing promotions, etc. in accordance with search terms entered by the user or optionally articles selected by virtue of their novelty and/or their relevance to a known attribute of the subscriber.

Examples of attributes of the subscriber include a "history" of most recently requested content, a record of content for which the user actively expressed a preference (for example giving a percentage or star rating or "liking" the content), and their current or registered location. Location may for example be determined by the billing address for the subscription, a location provided by the user in response to a query, a location calculated from a satellite location system reading (e.g. GPS, Galileo, etc), or the current location inferred from the access point from the user device to the internet (i.e. WiFi access point IP address, a cell ID in a cellular radio access network).

The automated selection of new articles is crude at best, since attributes such as usage history and location are given undue prominence over factors which may be more important to the reader (such as an expectation of a literary tone or style, a degree of quality or reporting reliability).

A more sophisticated method for distributing content to a plurality of subscribers which balances delivery of relevant information with the provision of content with a characteristic slant is therefore desirable.

SUMMARY OF THE INVENTION

According to one aspect of the invention there is provided a method for controlling the distribution of news content to a distribution target, the method comprising: acquiring a content item; processing the content item to extract information corresponding to at least one named entity; determining a trust bias weighting factor, the trust bias weighting factor being determined in dependence upon the named entity; determining a publisher bias weighting factor; for each user, determining one or more user-specific weighting factors; calculating a strength metric for the content item in accordance with the publisher bias weighting factor, the trust bias weighting factor and the or each user-specific bias weighting factor; wherein the method further comprises providing the content item to the distribution target in accordance with the strength metric.

In one embodiment, the content item is provided to the distribution target together with the calculated strength metric. The strength metric may therefore be used by the distribution target to prioritise the presentation of the content item relative to other content items having respective strength metrics.

In one embodiment, the provision of the content item is only performed when the strength metric exceeds a predetermined strength threshold level associated with the distribution target.

According to a further aspect of the invention, there is provided a system for controlling the distribution of news content to a distribution target, the system comprising: a memory for storing content items; a communications interface which operates to transfer data between the system and at least one knowledge source and between the system and a distribution target; and a processor which in operation acquires a content item from the memory and processes the content item to extract information corresponding to at least one named entity; wherein the processor is arranged to determine: a publisher bias weighting factor, a trust bias weighting factor, the trust bias weighting factor being determined in dependence upon the named entity and, for each user, one or more user-specific weighting factors; and wherein the processor is further adapted to calculate a strength metric for the content item in accordance with the publisher bias weighting factor, the trust bias weighting factor and the or each user-specific bias weighting factor; and wherein the processor is further adapted to transmit the content item to the distribution target via the communications interface in accordance with the strength metric.

In one embodiment, the content item is transmitted to the distribution target together with the calculated strength metric. The strength metric may therefore be used by the distribution target to prioritise the presentation of the content item relative to other content items having respective strength metrics.

In one embodiment, the transmission of the content item is only performed when the strength metric exceeds a predetermined strength threshold level associated with the distribution target.

Various further aspects and embodiments of the invention are provided in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 illustrates the logical architecture of a computing device suitable for implementing embodiments of the invention.

DESCRIPTION OF THE EMBODIMENTS

Figure 1A:
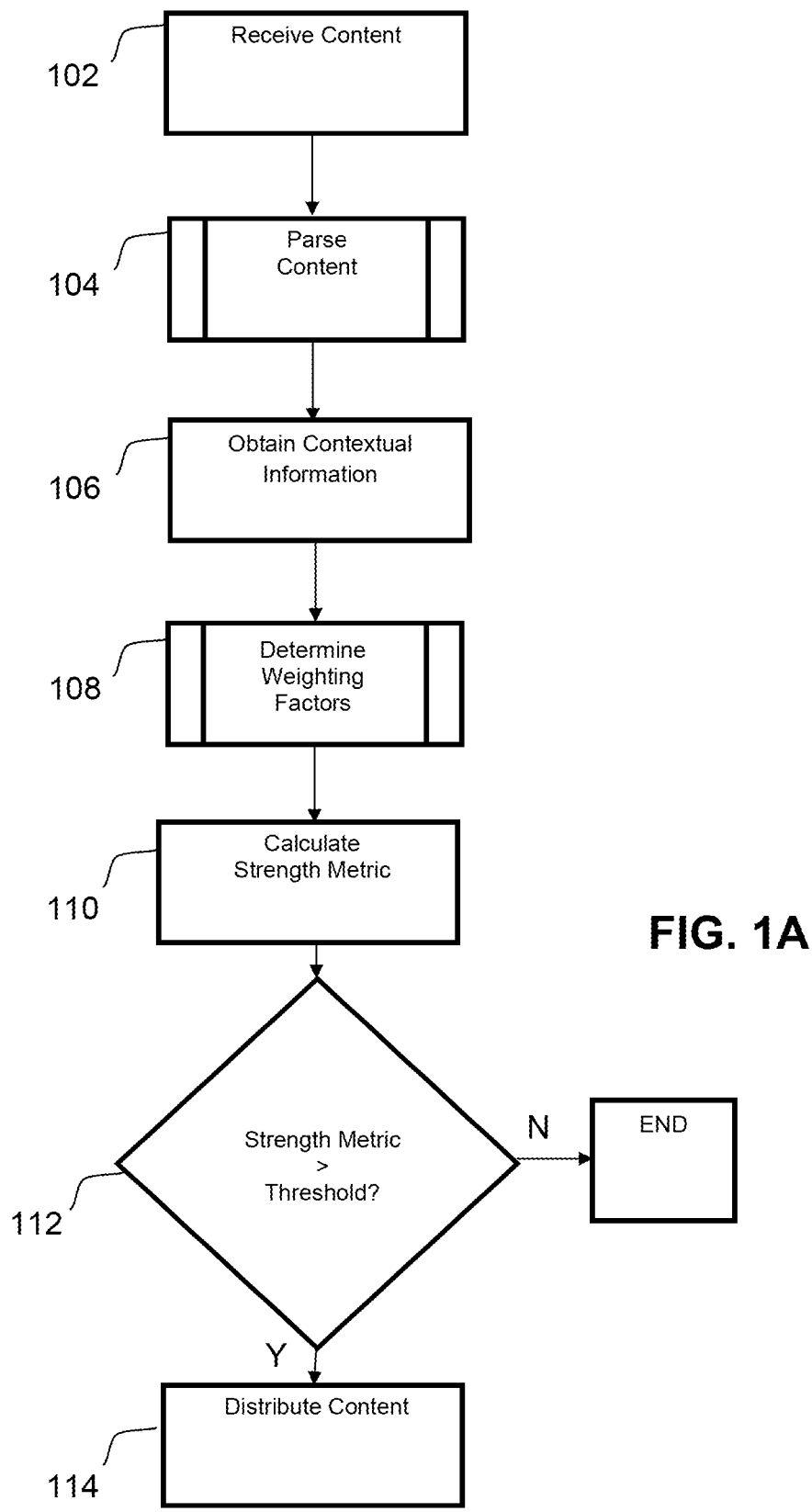
FIGS. 1A and 1B illustrate the flow of operations in the preparation of a content item for distribution in accordance with embodiments of the invention.

In certain embodiments, a news publication platform is provided that distributes content items on the basis of plurality of interrelated factors. These factors include user bias, geographic bias, network bias, publisher bias, trust bias time bias and advertising bias. User bias expresses the bias derived from the user's "track" (or usage history) and their cluster type (e.g. their age group, gender and reading patterns). Geographic bias corresponds to a degree of matching between a user's geographic profile and the geographic profile of the content item. Network bias is concerned with the social media phenomenon whereby users have one or more associated groups or influence clusters (so that, for example, content recommendation may be made based on content items popular for other members of those groups). Time bias is essentially the facility for reducing content importance according to publication time—introducing a "time decay" factor. Publisher bias concerns the publisher's facility to influence the general tone of the published content. Trust bias reflects the level of trust attributed to the publishing organisation and/or the level of trust attributed to the contributor of the content.

Further factors may be introduced to model the concerns of the various stakeholders in the news publication platform: thus in certain embodiments there may be an advertising bias—provided as a type of publisher bias so that sponsors of the publishing service can avoid accidentally providing marketing opportunities for their rivals; a reputation bias—which may allow content associated with named entities of higher "reputational value" (i.e. celebrities, fictional characters, brands etc.) to be matched to user interest in such things; and/or an emerging topic bias—which facilitates the prioritization or otherwise of certain content items depending upon whether they are determined to be associated with a "trending" topic.

Various exemplary biases are described below in more detail:

User Bias: this is a user bias based on the track (usage history) of content the user liked, and/or regularly reads. A machine learning model of weighted keywords based on this content is built and represents the user's preferred content. This model is updated regularly and all content is scored against it.

Network Bias: In certain embodiments each user is considered to belong to one or more clusters of users. Each cluster is determined by the user's features vector (i.e. the portion of the user profile recording "features" of the user such as the age group, gender, preferred language etc. for the user) as well as their content bias. A user belonging to cluster A, tends to share the same interests as other members of the cluster. He is hence likely to prefer content that other members read. This bias is not only useful in recommending "missed" content, content the user likes but did not read, but also novel content from the user's calculated cluster of similar users. As the user's interests shift, so will the cluster he belongs too.

Publisher Bias: In certain embodiments, the platform sources content items from other publishers (content providers)—using RSS feeds, for example. It is important that the publishers using the platform can choose to give their content bias so it remains high in the list of content presented to the targeted user. A local church newsletter in Bromley can use the platform to publish their news. Since their publishing frequency might be irregular or far spaced, their news can soon disappear in the multitude of articles offered from other news sources. The bias is there to ensure their content is always represented.

Trust Bias: In certain embodiments, each entity on the platform, be it a person or an organisation, a reader or a publisher, has a trust weight associated with it. "Trust" is attributed by the publishing administrator to regulate content by rewarding or penalising the content originator (person or organisation). The trust bias, then, is representative of the trust attributed to the content originator. Conveniently, all content originators (including organisations themselves) are considered to belong to organisations. Trust is also accumulated by positive scoring of content from the users (readers of content may of course be content originators themselves), and negatively scored by the administrator or the users as well. This mechanism ensures that persons and organisations who build trust in the system see their content prioritised over content of other "less trusted" originators, as it is deemed more "relevant".

This trust bias also ensures that those with a low trust level see their content scored lower. Therefore, without the need for direct policing, their content is pushed down the recommended list. In certain embodiments, persons or organisations with negative scores will not have their content published at all—the trust bias may be used to filter out such content. In other embodiments, a negative score for trust bias results in relegation to the extent that the content becomes effectively invisible—without the need for a filtering facility.

In certain embodiments, the trust bias is associated with the author or contributor to a content item and the organisation (or organisations) with which that author/contributor is associated. As such, the determination of a trust bias involves the derivation or filtering of the author and/or organisation from the content item. The trust bias can therefore be arranged to reflect the "trust" distributed not just to the author himself but also to his associated organisations. Furthermore, where the associated organisations have internal structure (regional offices, specialist departments, etc.) these internal structures may be attributed different levels of trust and the trust bias may be arranged to reflect some or all of different levels of trust in the sections of the organisation.

Time Bias: In certain embodiments, content is time stamped at creation within the platform. As the content becomes older, it is typically less relevant. A time decay factor is introduced in the operation of the platform to model this ageing content.

Geographic bias: In certain embodiments, each entity in the platform, be it a user, an organisation, a news item or an advertisement, has an associated geographic profile. A score is calculated as to the relevance of each content based on a measure of similarity between respective geographic profiles. Many content items have an interest value which corresponds to some extent with the geographical location of the content consumer. Thus when modelling the distribution of news content, news publishing platforms typically seek to characterize content as of "local" interest or of "regional" interest. In each case the driver is the need to provide timely reports that are geographically relevant to the readers of news content. These models however determine geographic relevance as a function of geographic proximity to the reader, with limited success. The concept of the "geographical profile" discussed in co-pending patent application GB 1307982.7 is therefore adopted. Certain details of the generation and applications of geographic profiles are discussed below.

Advertising bias: In certain embodiments, publisher bias may include a specific facility that allows sponsors of the publishing service to avoid accidentally providing marketing opportunities for their rivals. Thus in addition to promoting the content of the church newsletter, the publisher can demote articles which are likely to offend readers of the promoted content.

Emerging topic bias: In certain embodiments, a bias is introduced to facilitate the prioritization or otherwise of certain content items depending upon whether they are determined to be associated with a "trending" topic. For a subject topic to be considered trending it must have corroboration (i.e. the topic must appear from multiple sources) and it must be novel, in that it should be different from topics that have been, or are already, popular and well-known. Thus before an emerging topic bias can be determined, each emerging or novel trend must be identified.

To determine that a content item is associated with an emerging topic ("trending"), use is made of a training set of keywords. The training set corresponds to the current set of identified emerging trends and is typically generated from statistical treatment of content items aggregated over a relatively long time scale (i.e. of the order of weeks or months). When compared to news items aggregated over a shorter period (for example a period of a few hours, a day or a week) relative to the training set, keywords corresponding to terms which appear in the shorter period at comparative levels that are statistically significant may be considered "emerging". Keywords are used to reflect one or more semantically relevant topic or theme whereby plural content items may be associated into a cluster. They represent a matrix of associations rather than a single concept. By comparing the parsed profile of a newly fetched content item to the emerging keywords training set, the content item can be associated with an emerging topic bias that reflects the degree to which the content item relates to a new topic which appears to be trending.

Reputation bias: As discussed above, certain embodiments may introduce a bias that allows content associated with named entities of higher "reputational value" (i.e. celebrities, fictional characters, brands etc.) to be matched to user locale and readership interest. By parsing the content item to extract associated contextual information from one or more knowledge base of entities having established reputational value, the contextual information can be arranged to reflect the scale of interest attributable to the content item by virtue of the fame (or infamy) of the named entities in the content. A reputation bias may therefore be determined from an evaluation of the contextual information (i.e. the named entities).

Reputation bias is advantageously calculated in dependence upon geographic profile and topic. The mayor of London may have celebrity status in London and England but not in China. As the mayor is more closely associated with politics, he attracts a higher reputation bias in respect of a content item having politics as a topic that he would for a content item concerned with technology. Thus for a user having a locale preference for London and an interest in "politics", the bias score assigned to an article about Boris Johnson, (Mayor of London) is significantly higher than the score for a reader whose geographic focus is in Singapore and whose user track gives no indication of interest in "UK politics". The reputation bias may also be derived in part from mining sentiment.

In one embodiment, a publisher is provided with an interface whereby the respective weights of the respective biases may be altered.

An example of the model whose weights may be altered is presented below. This model is dynamic and allows the administrator to adjust the level of bias independently for each factor described above.

$$\text{StoryStrength} = T_d * [\beta*(W_{PublisherBias} + \text{buffer}_{constant}) + (1-\beta)*(\alpha_{11}W_{UserBias}) + \alpha_{12}W_{TrustBias} + \text{constant}] \quad \text{(equation 1)}$$

where—

$T_d$: Time decay factor.

α$_i$: Calibration factors.

β: Publisher bias factor. This is normalised between 0 and 1. β=1 for full publisher bias.

W$_i$: Weighted score of bias i.

The weighted scores in the model above include: W$_{PublisherBias}$ corresponding to the bias in favour of specific publishers; W$_{UserBias}$ corresponding to the bias inferred from the user's history and tracked preferences; and W$_{TrustBias}$ corresponding to the bias in favour of more trusted sources.

In the exemplary weighted summation model above, the weighted biases (W$_i$) are counterbalanced by other factors under the control of the model's administrator whereby the model is calibrated to balance the various biases in line with any desired overall editorial strategy. Thus the administrator can ensure the relative effect of variations in weighting biases through adjustment of "calibration factors", α$_i$. While each calibration factor, α$_i$, is typically calibrated in the range −1 to +1, it may take greater values where publication policy or administrator decision dictates.

It may be advantageous, as presented in this model, to allow publishers to have final overall control over content presented: to this end, the publisher bias factor, β, is introduced so that the effects of certain other weighting biases may be reduced or even extinguished (where β=1).

Naturally, the model described above is presented for illustrative purposes, the reader will appreciate that the expression for StoryStrength may be expressed in many other ways and including alternative bias factors, and any permutation or combination of the described weighting factor biases while still falling within the intended scope of the present invention. One further alternative expression might be $$\text{StoryStrength}=T_d*[\alpha_1 W_{emerging}+\alpha_2 W_{ReputationBias}+ (1-\beta)*(\alpha_3 W_{UserBias}+\alpha_4 W_{GeoBias}+ \alpha_5 W_{NetworkBias})+\beta*(W_{PublisherBias}+ \text{buffer}_{constant})+\alpha_6 W_{TrustBias}+\text{constant}]$$ (equation 2)

The parameters in the above weighted summation model are again—

T$_d$: Time decay factor.

α$_i$: Calibration factors.

β: Publisher bias factor. This is normalised between 0 and 1. β=1 for full publisher bias.

W$_i$: Weighted score of bias i.

In addition to weighted scores W$_{PublisherBias}$, W$_{TrustBias}$ and W$_{UserBias}$ discussed in the context of the previous model, the weighted scores used in this alternative model include: W$_{emerging}$ which corresponds to a bias in favour of news content directed to emerging (i.e. trending) news stories; W$_{ReputationBias}$ which corresponds to a bias in favour of news content including named entities having reputational value; W$_{GeoBias}$ corresponding to the bias inferred from comparison between the geographic profiles of the content item and the user; and W$_{NetworkBias}$ corresponding to the bias of the cluster or clusters of interests with which the user is associated; corresponding to the bias in favour of more trusted sources.

Figure 1B:
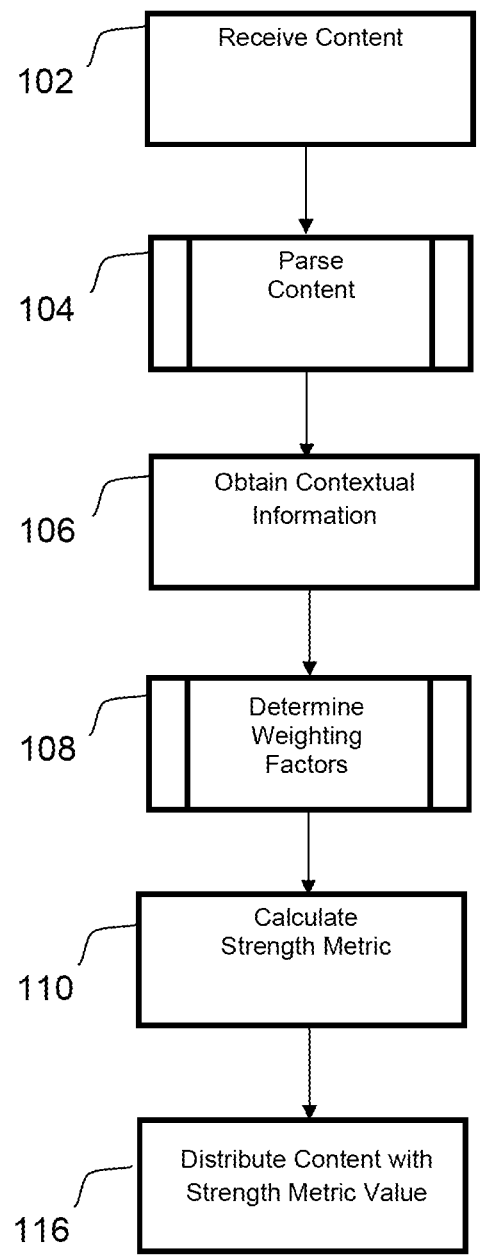
Figure 2:
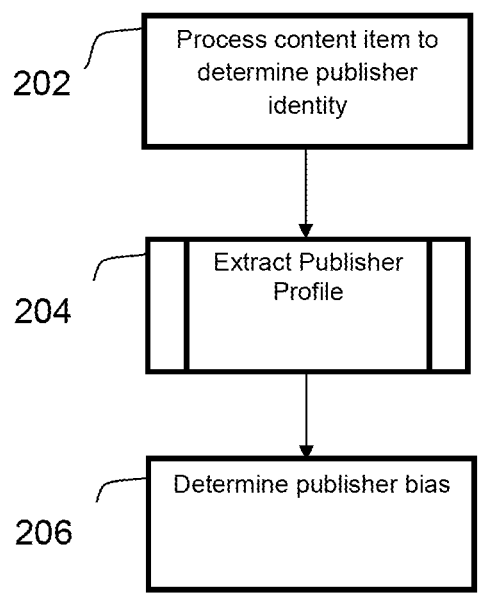
FIG. 2 illustrates the flow of operations in determining a publisher bias weighting factor.
Figure 3:
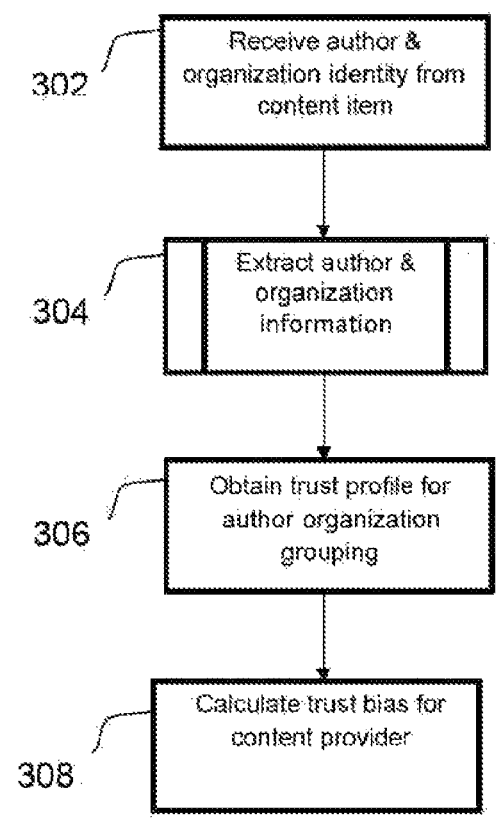
FIG. 3 illustrates the flow of operations in determining a trust bias weighting factor.
Figure 4:
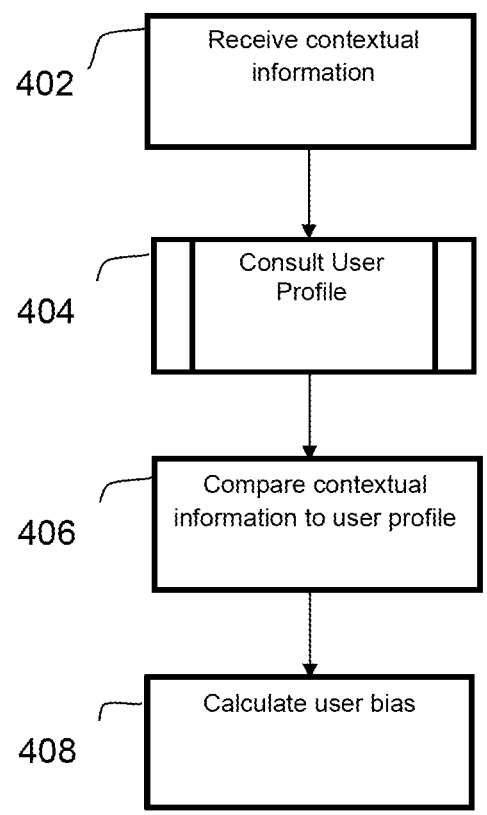
FIG. 4 illustrates the flow of operations in determining a user bias weighting factor.
Figure 5:
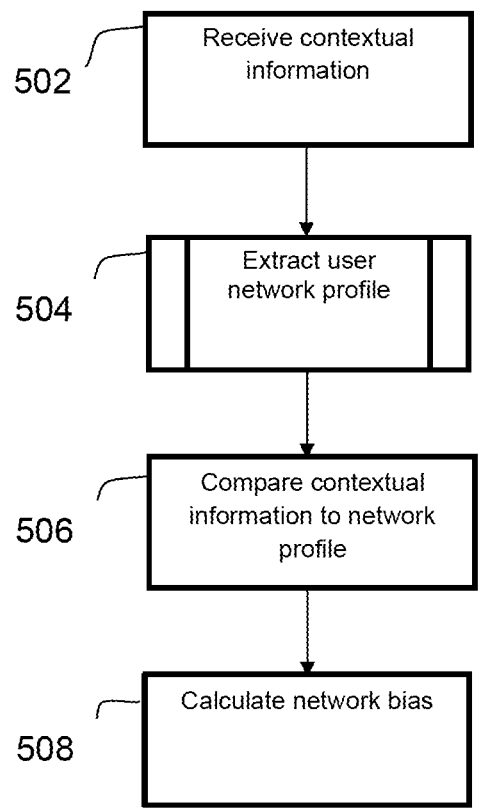
FIG. 5 illustrates the flow of operations in determining a network bias weighting factor.

FIGS. 1A and 1B illustrate two variants of the flow of operations in the preparation of a content item for distribution in accordance with embodiments of the invention. After a content item is received 102, the content is parsed 104 (this step is discussed in more detail below in relation to FIG. 7) to extract text and metadata. A database of contextual information is then consulted using the text and or metadata thus extracted. Contextual information associated with the extracted text/metadata is obtained 106—for example the location information or author/publishing organisation information.

Depending upon the particular weighting bias factor, the extracted text and/or the metadata is then used to determine a value for the weighting bias factor 108. Examples of the flow of operations in determining a respective bias weighting factors are discussed in greater detail below.

Using a predetermined model for an overall story strength metric, governed by an expression such as equation 1 or equation 2 above, some selection, permutation, or combination of weighting factor biases may be applied to any given content item to generate a single story strength metric 110.

In the variant illustrated in FIG. 1A, the story strength metric is then compared to at least one predefined threshold value 112. If the metric exceeds the threshold it is determined that the content item should be provided to (or recommended to) the distribution target (i.e. the reader) 114, otherwise the content item is not distributed.

In the variant illustrated in FIG. 1B, the story strength metric is distributed to the distribution target (i.e. a reader's browser application) so that the target can prioritise the content item relative to other content items similarly distributed with respective strength metrics.

FIGS. 2 to 6 illustrate the flow of operations in determining a publisher bias weighting factor, a trust bias weighting factor, and user specific bias weighting factors, such as user bias weighting factor, network bias weighting factor and geographic bias weighting factor.

In obtaining a publisher bias weighting factor (FIG. 2), the identity of the publisher may be implicit (for instance, if the new publication service is itself a provider of news content items), may be provided in the data structure of the content item (thus requiring no parsing of the content item to obtain the identity of the or each publisher). In some cases, however, it may be necessary to subject the content item to parsing analysis to determine the publisher of the content 202. Once identified, the publisher identity is used to extract a publisher profile 204 which may include information from which a publisher bias weighting factor W$_{PublisherBias}$ may be determined 206. In certain cases, the bias may be a predetermined value associated with the identified publisher: the publisher profile may include that predetermined value.

In generating a trust bias weighting factor (FIG. 3), the identity of the author or contributor is extracted from the content item, typically from the metadata, but occasionally from a byline in the text of the content item itself 302. In addition the identity of the or each organisation with which the author is associated is also extracted. Using the author and organisation identities to consult a knowledge base 304, a trust profile is obtained for the combined author and associated organisation 306. The bias weighting factor W$_{TrustBias}$ is calculated as a result 308.

In generating a user bias weighting factor (FIG. 4), contextual information is extracted from the content item, typically from the metadata, 402. The identity of the distribution target is known and a user profile is consulted for that user 404. Included in the user profile is a user track of content items previously "liked" or browsed by the user. The user track is compared to contextual information extracted from the content item 406 and the degree of similarity is used to calculate a user bias weighting factor W$_{UserBias}$ 408.

The user profile typically further includes a matrix of user-to-article matching. In generating a (user) network bias weighting factor (FIG. 5), contextual information is extracted from the content item, typically from the metadata, 502. The identity of the distribution target is known and a user profile is consulted for that user. Included in the user profile is a user feature vector constructed from information contributed by the user upon subscription, e.g. gender, age group, and information inferred about the user from user settings. The user feature vector is used to determine which cluster or clusters of users the reader belongs to and to extract the relevant respective network profiles 504. For those clusters, a user cluster feature matrix is generated: this matrix represents the aggregate preferences of the user cluster. The network profile(s) are compared to contextual information extracted from the content item 506 and the degree of similarity is used to calculate a network bias weighting factor $W_{UserBias}$ 508. The user track is consulted and where the track shows that this content has not been viewed and the content closely matches the aggregate preferences of the cluster, the match is affirmed and a different bias weighting is calculated than might be for content which is not a close match to the aggregate preferences of the cluster. Thus content which should interest the user (because it has been identified as a good match to the network profile for the respective clusters) but has not yet been accessed by the user, is promoted.

In order to be able to calculate a geographic bias weighting factor, contextual information is extracted from the content item from both metadata and text, 602. The extracted text and metadata is parsed and or processed to generate (or update) a spatial definition. In parallel to this, a user geographic profile is prepared (to correspond to the distribution target—typically the user)—this too includes a spatial definition. The user's geographic profile is extracted 604. The respective spatial definitions are compared 606. An attraction factor between the two spatial definitions is calculated and this is used to generate a geographic bias weighting factor $W_{GeoBias}$ 608.

Where location information is included in the extracted text, a knowledge base of contextual information is consulted and contextual information associated with the extracted location information is obtained. This contextual information is used to generate a spatial definition that represents the location information in a form that can be used in refining further contextual information obtained and for characterising the content item geographic context. As each entity within the news publication platform has an equivalent spatial definition, calculation of an attraction factor between the two spatial definitions can be used to generate a suitable geographic weighting bias factor—where the two spatial definitions relate to entirely different locations the weighting factor would typically be set at or near 0, whereas spatial definitions having substantial overlap or correlation would be assigned a far larger weighting factor.

Figure 7:
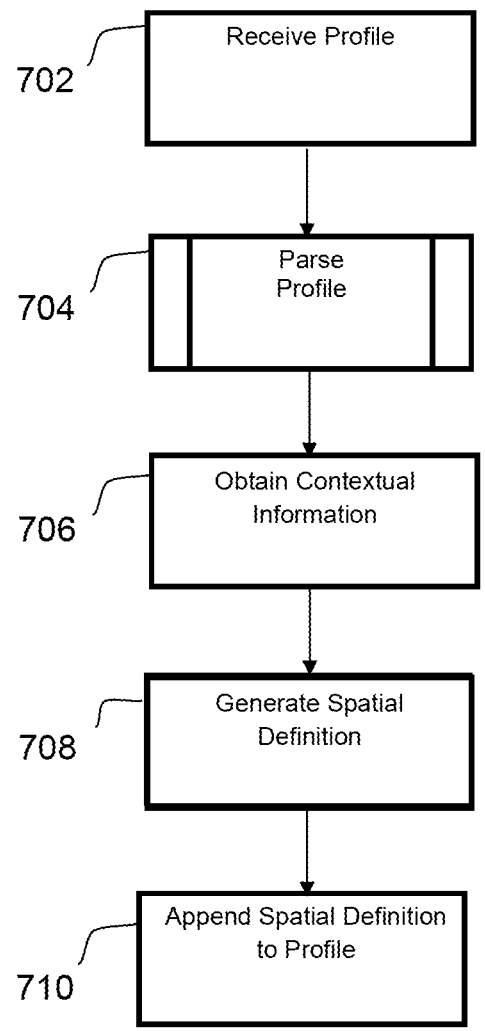
FIG. 7 illustrates the flow of operations in the preparation of a user profile item corresponding to a distribution target in accordance with an embodiment of the invention.

FIG. 7 illustrates the flow of operations in the preparation of a profile item corresponding to a distribution target. By treating the profile of each distribution target (typically an individual reader or a group of users with common interests) as a dynamic content item, the profile can be represented in a manner that lends itself to comparison with the content items.

After a profile item is received 702, the profile is parsed 704 to extract text and metadata (for instance, the current location of the reader or the business premises address of the subscriber's employer). Where location information is included in the text, a knowledge base of contextual information is consulted and contextual information associated with the extracted location information is obtained 706. This contextual information is used to generate a profile spatial definition 708 that represents the profile location information in a form that can be used in refining further contextual information obtained and for characterising the geographic profile of the distribution target. This profile spatial definition is ultimately appended to the content item as metadata 710.

Figure 8:
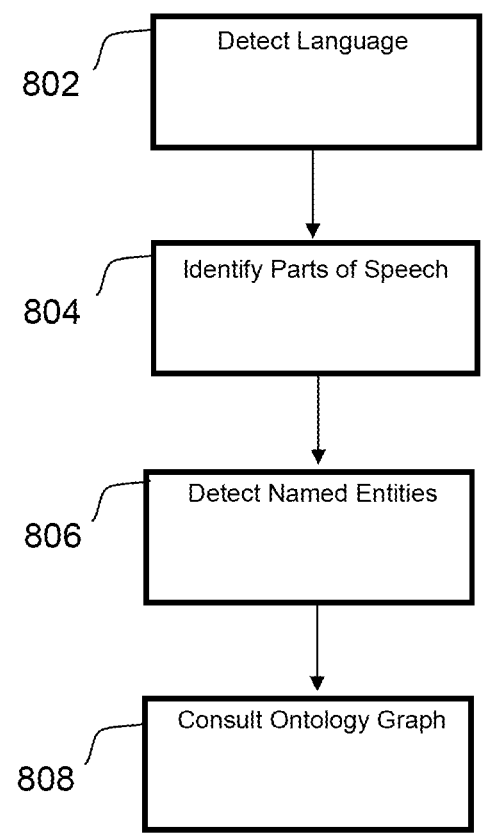
FIG. 8 illustrates the detailed flow of operations in the step of parsing textual information in FIG. 1.

The parsing of the content item 104 conventionally includes a number of steps, as illustrated in FIG. 8. Firstly, the language (or languages) used in the text may be detected 802. Using models of the detected language, parts of speech (such as nouns, verbs, adjectives etc.) are then identified 804. Named entities are detected from amongst the nouns identified in this manner 806 and these are then processed to extract meaningful terms, by referring to one or more ontology graph 808 (i.e. knowledge base). A noun (or named entity) may relate to a nontangible concept (such as time or emotion) or to a tangible concept (such as a person, a place etc.).

Figure 9:
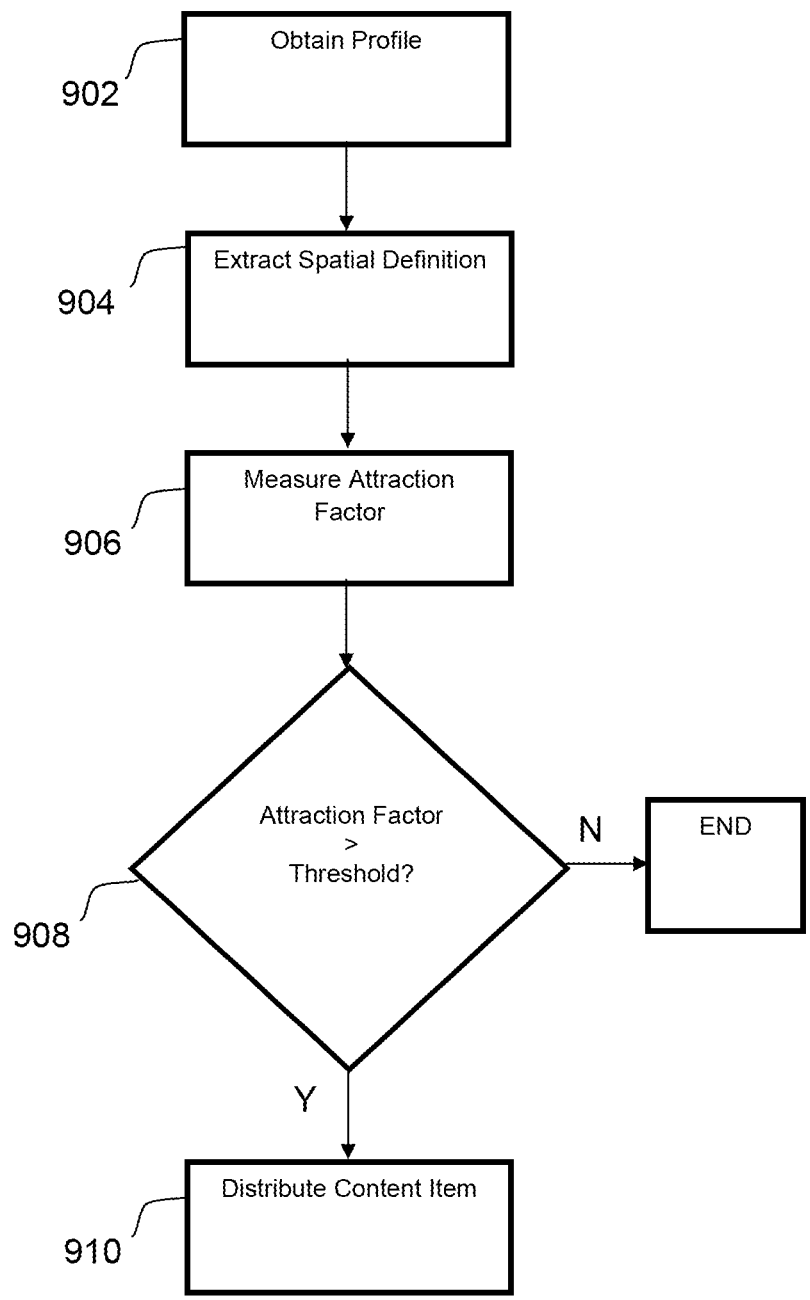
FIG. 9 illustrates the flow of events in distribution of content items in accordance with embodiments of the invention.

Distribution of content on the basis of a geographic profile proceeds as illustrated in FIG. 9. Having obtained a profile for the distribution target 902, a spatial definition is obtained from the content item 904. As the profile spatial definition and the content item spatial definition are expressed in a common format, they can be processed to establish an attraction factor between the content and the target 906.

Figure 6:
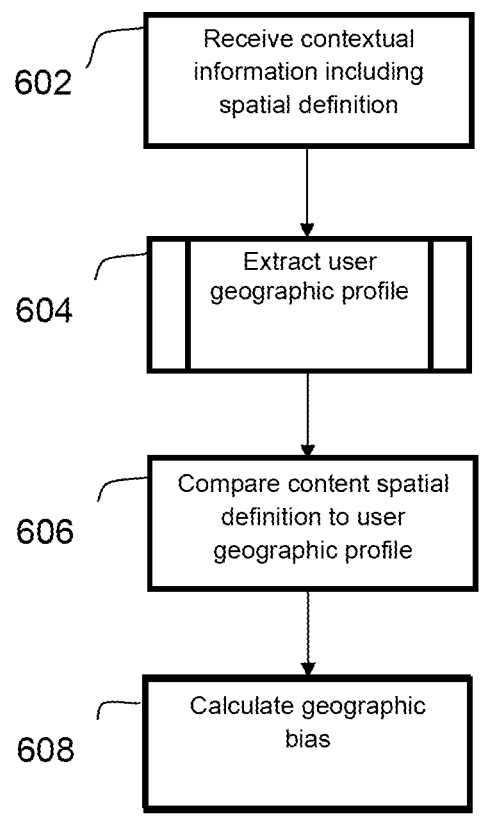
FIG. 6 illustrates the flow of operations in determining a geographic bias weighting factor.

As discussed in the context of FIG. 6, the attraction factor may be used as the geographic bias weighting factor.

In simple case where no other bias weighting factors are applied, the attraction factor alone can determine whether the content item is appropriate for distribution to a given target. In certain cases the recommendation list may be governed by a cut-off threshold so that, where the attraction factor exceeds a predetermined threshold (i.e. content items have a minimum measure of affinity to the profile) 908, the content item is accepted for distribution to the distribution target 910. Otherwise, the content item is not distributed to that target.

In other embodiments, content may remain available but becomes successively relegated so that the content becomes successively less visible without needing to be actively discarded or filtered out. How such low visibility content is treated may be subject to reader preference.

Figure 10:
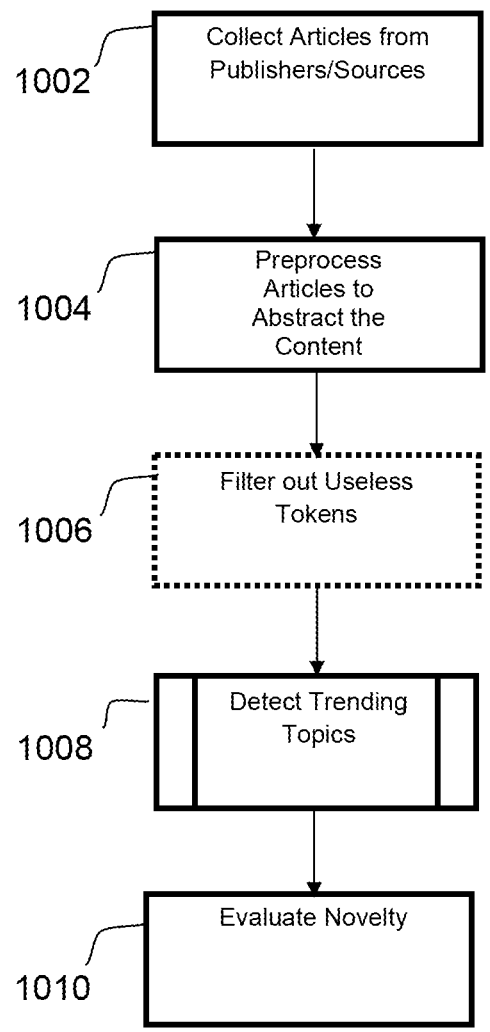
FIG. 10 illustrates the flow of operations in determining an emerging topic bias weighting factor.

In generating an emerging topic bias weighting factor, $W_{emerging}$ (FIG. 10), it is first necessary to construct (or update) a set of recent topics against which a newly fetched article may be compared. The new article then forms part of the corpus from which an updated set is generated.

For a subject topic to be considered "trending" it must have corroboration (i.e. the topic must appear from multiple sources) and it must be novel, in that it should be different from topics that have been, or are already, popular and well-known.

To determine emerging topic bias, it is first necessary to collect articles (or other output) from publishers or other content sources (step 1002). As for other biases, these articles are processed to generate an abstract representation of the content (step 1004); in certain embodiments this representation comprises a plurality of "tokens". Optionally, certain tokens are filtered out of the representations using so-called "feather filters" (step 1006): in a concrete example, the words "the" or "a" would typically be of no use in determining whether an article containing them was an emerging topic and could safely be discarded. The tokens in the representation are then subjected to one or more trend detection step (step 1008) and any newly collected article is compared to the resulting body of detected trending topics to classify its content (step 1010).

Trend detection, then, is based on the semantics of an article/theme and is constrained by the density of the topic occurrence across many publishers. Conveniently, more weight is given where the publisher's trust is highest. A topic is tracked over multiple iterations of content fetch cycles to assess its rate of emergence. The detection process may be further reinforced by incorporating the users' feedback from the numbers of views, likes, comments and sharing on social media.

In certain embodiments, emerging trend detection is based on cosine similarity and machine learning. This approach inherently rankings news items by importance. Any content is parsed, indexed and associated to a cluster representing a concept or a theme. The theme is monitored by tracking the cluster of content as it is updated and refreshed at each content fetch cycle.

In certain embodiments, however, emerging trend detection is based on "basis learning". This approach is concerned with detection of news by virtue of its novelty. This approach is most relevant to news that is not only emerging but also novel. This would cover instances of news that are not common during a select period of time, and would reflect events in news that are unique, such as natural disasters, disease outbreak or aliens landing on earth.

Figure 11A:
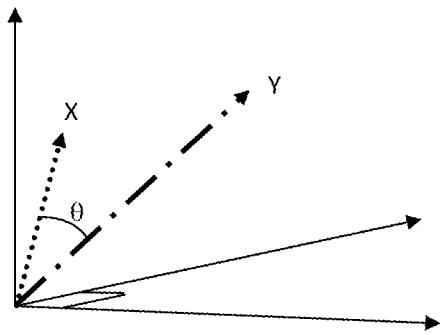
FIG. 11A illustrates cosine similarity.

These two approaches are considered in more detail below:

As illustrated in FIG. 11A, Cosine Similarity is a technique for comparing the similarity of two vectors. In the analysis of text content, any text may be considered as a constructed from a dictionary of N words. Two articles, X and Y, can therefore be compared by considering each article as an N-parameter vector in N dimensional space. Cosine similarity relies on the relationship between the inner product of two vectors and the (cosine of the) angle between them.

$$x \cdot y = |x||y|\cos\theta$$

Where x and y are N-parameter vector representations of X and Y, cos θ will take a value of close to 1 when the angle is small (indicating similarity between the representations of the two articles) and nearer to 0 when the angle approaches 90° (indicating near-independence of the two articles). One common technique for calculating the cosine value uses "term frequency-inverse document frequency" (tf-idf) for a plurality of words in each article: tf-idf is essentially a measure of the relative importance of a given word to a document within a cluster (or corpus) of documents.

Figure 11B:
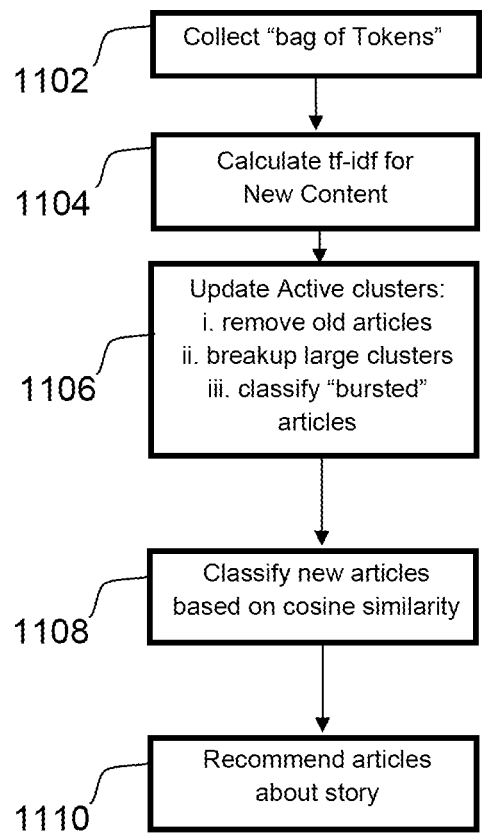
FIG. 11B illustrates a step of emerging topic detection using cosine similarity.

FIG. 11B illustrates the cosine similarity and machine learning approach to trending topic detection. Firstly, a "bag of tokens" is collected from content (step 1102): the tokens are a selection of a plurality of available tokens (e.g. words, groups of words, contextual information, metadata) associated with the content. Next, tf-idf values are calculated for the tokens of the new content (step 1104). The tf-idf values are used to update active clusters of tokens (step 1106): this step includes: i) removing old articles; ii) "exploding" or breaking of large clusters into sections; and iii) classifying articles resulting from any "bursting" of those large clusters. Next, new articles are classified based on cosine similarity to the updated active clusters (step 1108). If necessary, one or more new clusters may be generated at this stage. Finally, the emerging topic bias is calculated based on the classification (step 1110) and as a result the platform may recommend articles about the (trending) story and derive the realtime history of the story.

Identification and maintenance of a set of "useful" clusters is thus important in identifying trending topics. As more content becomes affiliated (i.e. classified) to a cluster, the cluster gains "buoyancy" and it rises in relative weight above all other concepts, thus gaining importance. A cluster may also lose buoyancy as its constituent content is removed through an ageing process or through the "explosion" of the cluster bubble.

Removing old articles (step 1106 i.) has a consequent effect upon the tf-idf weights of existent articles, as well as the tf-idf weights and the scores of existent clusters, all of which need to be updated when the removing process is done. In the process of cluster explosion (step 1106 ii.), clusters in which the variances of the tf-idf of articles exceed some threshold, will burst. The rationale of the burst is that clusters composed of divergent articles may represent several related concepts. Once a cluster is broken up, its constituent content is reclassified into a specific number of clusters by the K-means approach (step 1106 iii.).

It should be noted that the K-means approach is conveniently implemented only for the articles from the "burst" clusters rather than all the existent articles to reduce computational complexity. An emerging trend score for the newly generated cluster is calculated, or updated for the merged cluster. The emerging topic bias is thus calculated for a given content item by calculating the respective cosine similarities between the parsed profile of content item to members of the updated training set of emerging trend scores.

Figure 11C:
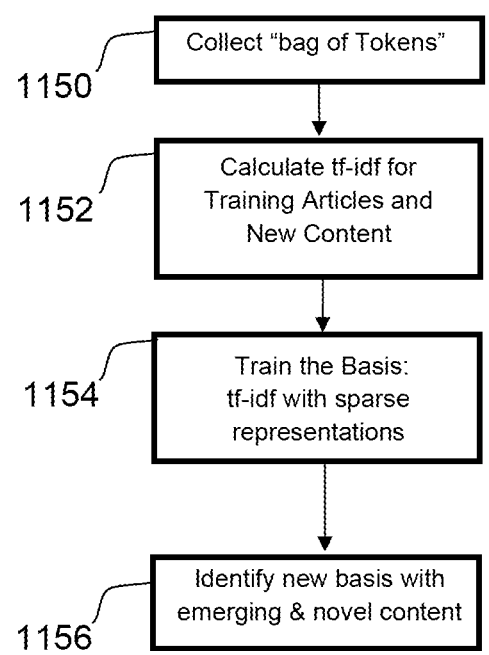
FIG. 11C illustrates a step of emerging topic detection using basis learning.
Figure 12:
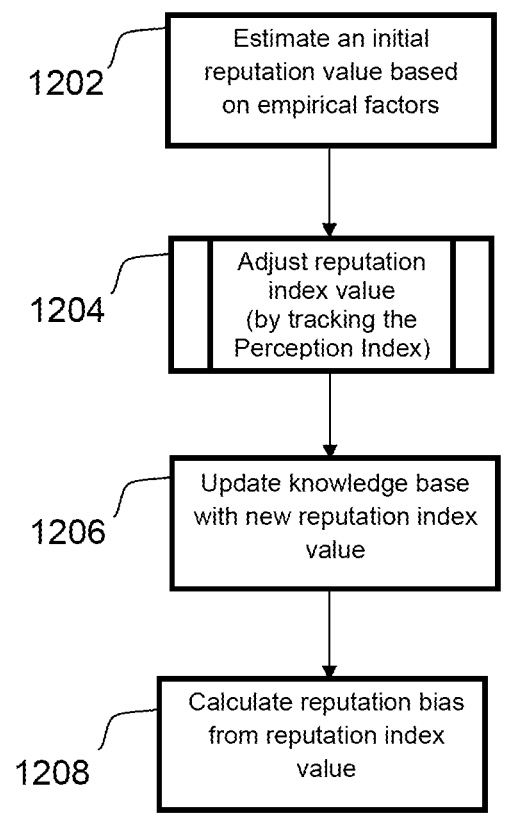
FIG. 12 illustrates the flow of operations in determining a reputation bias weighting factor.

FIG. 11C illustrates the basis learning approach to trending topic detection. For successful emerging topic detection, we need to identify several recent articles that are both similar to each other, and are dissimilar to previous posts.

The basis learning approach is inspired by the sparse characteristic of natural signals that contain only a few "atoms" in a transformed domain. Transformation into the "atomised" domain can be seen as process of projecting the signals from the observation domain into a "feature" domain, where each coefficient of the signal in the projected domain represents one basic component. Consider, for example, audio signals: they typically have only a few nonzero frequency elements when subjected to Fourier transformation.

By analogy, if a new content item (article) cannot be represented with low error as a sparse linear combination of atoms, it is a good indicator of novelty of the article. Novel documents, thus identified, are used to learn a new basis of novel topics. This new basis is then used to cluster similar novel posts together, which we identify as the emerging topic clusters. There is no deterministic transformation for signals of unknown structure such as the tf-idf value for the article. However, by using a training process, one can obtain a basis, i.e. a linear transformation, where the training signals show sparse characteristics. If the training data is large enough and the new signals contains the same structure as the training data, one can also observe sparse representations of the new signals by exploiting the learned basis. Conversely, if the new signals contain some novel structures, their representation in the learned basis would not be sparse. Thus, emerging articles can be determined by their representations in the basis learned by using training (old) articles. The process of the basis learning approach is composed of the following steps:

Step 1150: Collect a bag of tokens from articles;
Step 1152: Calculate the tf-idf for both training articles and new articles;
Step 1154: Train the basis where the tf-idf of training articles have sparse representations; and
Step 1156: Detect emerging novel content.

Step 1150 and step 1152 are as the same as step 1102 and step 1104, respectively, of the first approach. Firstly, a "bag of tokens" is collected from content (step 1150): the tokens are a selection of a plurality of available tokens (e.g. words, groups of words, contextual information, metadata) associated with the content. Next, tf-idf values are calculated for the tokens of the new content (step 1152).

The training step uses a generalisation of the K-means approach that updates a sparse dictionary matrix one column at a time known as K-means single value decomposition—K-SVD.

In the training step (step 1154), the sparsifying basis is learned by the K-SVD algorithm. Inputs of the algorithm include a matrix composed of the tf-idf vectors of training articles (a "dictionary"), the representation dimension, and the sparsity level. Note that the representation dimension could be:
 i) smaller than the size of the tf-idf vector, e.g. by using the principle component analysis; or
 ii) equal or larger than the size of the tf-idf vector by using the K-SVD algorithm.

In the emerging trend detection step (step 1156), the sparse representation of the tf-idf vector of a new article is calculated by using the subspace pursuit algorithm.

It is further remarked that emerging trend detection is an online process, i.e., the detection proceeds when a batch of articles have been collected. In contrast, for an offline process, detection is conducted when all articles have been collected. In addition, user interaction function is integrated into the recommendation step of both approaches to reinforce results from the trend detection algorithm.

These approaches have been described as alternatives, however it is also contemplated that these approaches may be applied in combination with each other and/or with other conventional emerging trend detection approaches.

As explained above, knowledge bases may be viewed as graph structures where nodes, representing entities such as individuals and organisations, are linked to one another by semantic correspondences, i.e. mappings. Each node in the graph structure stores information about itself but also about how it interacts with other nodes. That information may include state information.

While "reputation" represents a state for an entity, it is influenced by publications which might be considered to drive the reputation of a person or organisation up or down. Every "entity" in the knowledge base for the present system is conveniently associated with a reputation index. In generating a reputation bias weighting factor $W_{ReputationBias}$ from a cold start scenario, the system uses the "Wisdom of Crowds" as well as state information collected on the entity to estimate an initial reputation index value (step 1202).

Thus, person entities may have an initial reputation index value assigned to them according to their profession, achievement status and presence on internet reference sources such as wikipedia and freebase.

The reputation index value may then be adjusted by tracking the "Perception Index" of each entity in the graph structure through news publication as well as content published on Social Network channels (step 1204). An entity's perception index is tracked by estimating the positive or negative impression an item of content generates with regard to an entity appearing prominently in the content ("prominence" is in turn estimated based on the weight an entity gains in the content it is linked to, through number of occurrences and editorial focus, such as appearing on the content title).

The impression is altered whenever the relationship between an Entity (Person, Organisation) and other tangible and nontangible entities is updated. For example: a nontangible entity might be an event such as death, accident linked to a person, or an event such as collapse, bankrupt related to an organisation.

As a content source is mined and analysed, the graph structure of the knowledge base is updated regularly so as to reflect the new reputation index value of an entity present in the graph based on the perception tracking detected for that entity (step 1206). Reputation is bound by locale and context and only becomes relevant if it relates to a user's geographic and content preferences. Once a reputation index value is estimated, this value is used as reputation bias weighting factor W ReputationBias (step 1208).

Figure 13:
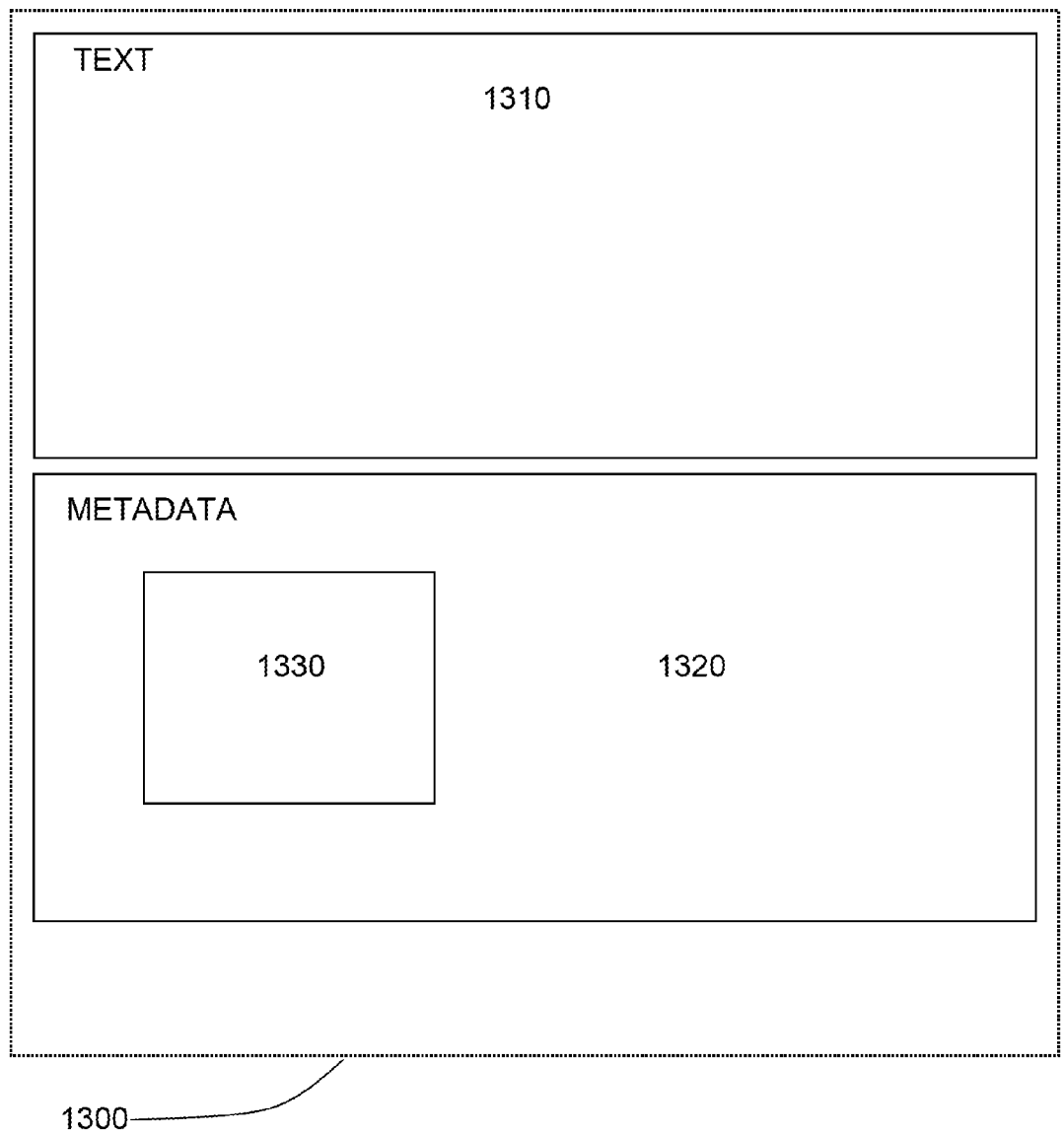
FIG. 13 illustrates features of a content item.

FIG. 13 illustrates diagrammatically the structure of a typical content item 1300. The content item includes textual information 1310 and metadata 1320. Where the process described in respect of FIG. 1 has been applied, the metadata includes a spatial definition 1330.

In another aspect of the invention, illustrated in FIG. 14, a general purpose computer having at least one processor 1402, storage means (non-volatile and/or volatile) 1404, a input/output interface 1406, and a bus 1408 connecting the processor 1402, I/O interface 1406 and storage means 1404. The I/O interface 1406 is adapted to connect to a plurality of distribution target devices 1110, such as desktop computers, laptops, touchscreen tablets, PDAs, and/or smart phones and to remote distributed knowledge sources 1420, which house ontology graphs. Suitable connections may be implemented using conventional wireless and/or wired communication networks. The knowledge sources 1420 may be accessed via an internet protocol link to a file server such that the knowledge source is accessible via an Internet based link such as a link to a cloud storage facility.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for controlling the distribution of news content to a distribution target, the method comprising:
 acquiring a content item;
 processing the content item to extract information corresponding to at least one content originator;
 determining, using a processor, a trust bias weighting factor, the trust bias weighting factor being determined in dependence upon the at least one content originator;
 determining, using the processor, a publisher bias weighting factor relating to a publisher of the content item;
 for each user, determining one or more user-specific bias weighting factors relating to one or more content preferences of the distribution target;
 calculating, using the processor, a strength metric for the content item in accordance with the publisher bias weighting factor, the trust bias weighting factor and the one or more user-specific bias weighting factor; and
 providing the content item to the distribution target in accordance with the strength metric;
 wherein the at least one content originator is an author name and in which the author name is used in the determination of the trust bias weighting factor, and wherein the step of processing the content item includes obtaining at least one organization name for which a knowledge source holds contextual information associated with the author name and wherein the organization name is used in the determination of the trust bias weighting factor.

2. A method as claimed in claim 1, wherein the content item is provided to the distribution target together with the calculated strength metric.

3. A method as claimed in claim 1, wherein the content item is provided to the distribution target only when the strength metric exceeds a predetermined strength threshold level associated with the distribution target.

4. A method as claimed in claim 1, wherein the strength metric is calculated by a weighted summation process.

5. A method as claimed in claim 1, wherein the one or more user-specific bias weighting factors include at least one of a user bias weighting factor, a network bias weighting factor and a geographic bias weighting factor.

6. A method as claimed in claim 1, wherein the trust bias weighting factor is calculated by comparison with a reference trust profile.

7. A method as claimed in claim 1, wherein the step of determining the publisher bias weighting factor includes:
  determining a publisher identity for the content item; and
  obtaining the publisher bias weighting factor associated with the publisher identity from a knowledge source.

8. A method as claimed in claim 1, wherein the step of processing the content item includes:
  parsing the content item to extract text information and metadata, said text information including at least one given content originator; and
  obtaining contextual information associated with the at least one given content originator from a knowledge source.

9. A method as claimed in claim 8, wherein the text information corresponds to a geographic location.

10. A method as claimed in claim 8, wherein the text information corresponds to a particular one of the at least one given content originators having reputation index value, said value being determined from said contextual information.

11. A system for controlling the distribution of news content to a distribution target, the system comprising:
  a memory for storing content items;
  a communications interface which operates to transfer data between the system and at least one knowledge source and between the system and a distribution target; and
  a processor which in operation acquires a content item from the memory and processes the content items to extract information corresponding to at least one content originator;
  wherein the processor is configured to determine:
    a publisher bias weighting factor,
    a trust bias weighting factor, the trust bias weighting factor being determined in dependence upon the at least one content originator and,
    for each user, one or more user-specific bias weighting factors;
  and wherein the processor is further configured to calculate a strength metric for the content item in accordance with the publisher bias weighting factor, the trust bias weighting factor and the one or more user-specific bias weighting factor; and
  to transmit the content item to the distribution target via the communications interface in accordance with the strength metric;
  wherein the at least one content originator is an author name and in which the author name is used in the determination of the trust bias weighting factor, and
  wherein the process is configured to process the content item includes obtaining at least one organization name for which a knowledge source holds contextual information associated with the author name and wherein the organization name is used in the determination of the trust bias weighting factor.

12. A system as claimed in claim 11, wherein the content item is transmitted to the distribution target together with the calculated strength metric.

13. A system as claimed in claim 11, wherein the transmission of the content item is only performed when the strength metric exceeds a predetermined strength threshold level associated with the distribution target.

14. A system as claimed in claim 11, wherein the strength metric is calculated by a weighted summation process.

15. A system as claimed in claim 11, wherein the one or more user-specific bias weighting factors include at least one of a user bias weighting factor, a network bias weighting factor and a geographic bias weighting factor.

16. A system as claimed in claim 11, wherein the processor determines the publisher bias weighting factor by:
  determining a publisher identity for the content item; and
  obtaining the publisher bias weighting factor associated with the publisher identity from a knowledge source.

* * * * *